(12) United States Patent
Chen et al.

(10) Patent No.: US 11,184,225 B2
(45) Date of Patent: *Nov. 23, 2021

(54) PATTERN BASED NETWORK CONFIGURATION

(71) Applicant: International Business Machines Corporation, Armonk, NY (US)

(72) Inventors: Milly Chen, Beijing (CN); Dan Lu, Beijing (CN); Chun Feng Wu, Beijing (CN); Nan Zhang, Beijing (CN); Xiao Yang Zhu, Beijing (CN)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/517,873

(22) Filed: Jul. 22, 2019

(65) Prior Publication Data

US 2019/0349250 A1 Nov. 14, 2019

Related U.S. Application Data

(63) Continuation of application No. 14/881,902, filed on Oct. 13, 2015, now Pat. No. 10,411,954.

(51) Int. Cl.
  *G06F 15/16* (2006.01)
  *H04L 12/24* (2006.01)
  *H04L 29/08* (2006.01)
  *H04L 29/06* (2006.01)

(52) U.S. Cl.
  CPC ...... *H04L 41/0803* (2013.01); *H04L 65/1069* (2013.01); *H04L 67/10* (2013.01); *H04L 69/324* (2013.01); *H04L 69/325* (2013.01)

(58) Field of Classification Search
  CPC . H04L 41/0803; H04L 65/1069; H04L 67/10; H04L 69/324; H04L 69/325
  USPC ........................................................ 709/220
  See application file for complete search history.

(56) References Cited

U.S. PATENT DOCUMENTS

| | | |
|---|---|---|
| 5,138,614 A | 8/1992 | Baumgartner |
| 6,160,813 A | 12/2000 | Banks |
| 6,731,646 B1 | 5/2004 | Banks |
| 6,961,308 B2 | 11/2005 | Suzuki |
| 7,333,473 B1 | 2/2008 | Hurtta |
| 7,653,032 B2 | 1/2010 | Sinha |
| 8,201,237 B1 | 6/2012 | Doane |

(Continued)

FOREIGN PATENT DOCUMENTS

| | | |
|---|---|---|
| WO | WO2013040207 A1 | 3/2013 |
| WO | WO2014086043 A1 | 6/2014 |

OTHER PUBLICATIONS

P. Mell, et al. "*The NIST Definition of Cloud Computing*", NIST Special Publication 800-145, Sep. 2011, Gaithersburg, MD.

(Continued)

*Primary Examiner* — Moustafa M Meky
(74) *Attorney, Agent, or Firm* — Stephanie Carusillo; George S. Blasiak; Heslin Rothenberg Farley & Mesiti PC

(57) ABSTRACT

Methods, computer program products, and systems are presented. There can be provided for example: obtaining user defined connectivity pattern information; and establishing commands for provisioning one or more network device for implementation of a network connection based on the user defined connectivity pattern information.

25 Claims, 14 Drawing Sheets

(56) References Cited

U.S. PATENT DOCUMENTS

| | | | |
|---|---|---|---|
| 8,429,403 B2 | 4/2013 | Moret | |
| 8,510,445 B2 | 8/2013 | Sugauchi | |
| 8,526,885 B2 | 9/2013 | Lin | |
| 8,732,798 B2 | 5/2014 | Kim | |
| 8,874,755 B1 | 10/2014 | Deklich | |
| 8,918,513 B2 | 12/2014 | Vendrow | |
| 8,949,434 B2 | 2/2015 | Vellanki | |
| 9,030,004 B2* | 5/2015 | Park | H01L 23/5384 257/713 |
| 9,137,209 B1 | 9/2015 | Brandwine | |
| 9,235,844 B2 | 1/2016 | Paul | |
| 9,305,301 B2 | 4/2016 | Paul | |
| 9,386,048 B2 | 7/2016 | Harrison | |
| 9,392,613 B2 | 7/2016 | Lysejko | |
| 9,699,139 B2 | 7/2017 | Mensah | |
| 9,754,921 B2* | 9/2017 | Park | G11C 5/06 |
| 9,824,311 B1 | 11/2017 | Cruz-Albrecht | |
| 10,411,954 B2* | 9/2019 | Chen | H04L 65/1069 |
| 2003/0098506 A1* | 5/2003 | Haraguchi | H01L 25/0655 257/735 |
| 2009/0180257 A1* | 7/2009 | Park | H01L 23/5384 361/709 |
| 2010/0042834 A1 | 2/2010 | Moret | |
| 2011/0276447 A1 | 11/2011 | Paul | |
| 2013/0077374 A1* | 3/2013 | Park | G11C 5/06 365/63 |
| 2015/0104172 A1 | 4/2015 | Wang | |
| 2015/0221615 A1* | 8/2015 | Park | H01L 23/5384 257/737 |
| 2016/0006610 A1 | 1/2016 | Brandwine | |
| 2016/0269279 A1 | 9/2016 | Beshai | |
| 2016/0285831 A1 | 9/2016 | Doane | |
| 2016/0294653 A1 | 10/2016 | Harrison | |

OTHER PUBLICATIONS

Ruth, P.; Dynamic Network Provisioning For Data Intensive Applications in the Cloud; 2012 IEEE 8th International Conference; Oct. 2012.

Mohan, Satish; Dynamic Insertion of Network Devices in Cloud Centric Networks; Nov. 4, 2011.

List of IBM Patent and/or Patent Applications treated as related for U.S. Appl. No. 16/517,873, filed Jul. 22, 2019, dated Jul. 22, 2019.

* cited by examiner

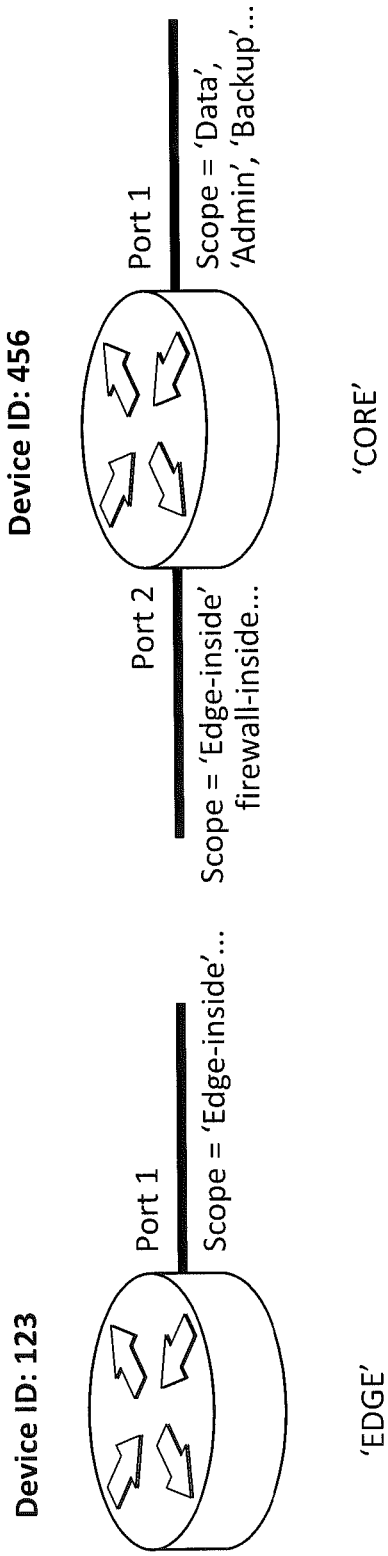

| Access Method | | VPN | | | | |
|---|---|---|---|---|---|---|
| Tenant ID | | abc | | | | |
| VLAN Subnets | | | | | | |
| | Subnet | | | | | |
| | 1st | 2nd | 3rd | 4th | Prefix | |
| Data | 10 | 1 | 1 | 1 | /24 | |
| Admin | 10 | 1 | 2 | 1 | /24 | |
| Backup | 10 | 1 | 3 | 1 | /24 | |
| POD VLAN Triplet | VLAN ID | | | | | |
| Data | 1000 | | | | | |
| Admin | 2000 | | | | | |
| Backup | 3000 | | | | | |
| Internet Resources | | | | | | |
| | Subnet | | | | | |
| | 1st | 2nd | 3rd | 4th | Prefix | |
| Assigned NAT Pool | | | | | /30 | |
| Internet IP Address | | | | | /29 | |
| DMZ Subnet | | | | | /29 | |
| DMZ VLAN ID | 4000 | | | | | |

*FIG. 10*

PATTERN BASED NETWORK CONFIGURATION

CROSS-REFERENCE TO RELATED APPLICATION

This application is a continuation of U.S. application Ser. No. 14/881,902, filed Oct. 13, 2015, titled "Pattern Based Network Configuration", which is incorporated by reference herein in its entirety.

TECHNICAL FIELD

The present disclosure relates to a cloud computing environment and in particularly to configuration of a network in a cloud computing environment.

BACKGROUND

To meet the continuing demand for high-capacity distributed data centers and the increasing need for scalable computing resources, the computer industry has pursued technologies to enable large-scale deployments of cloud computing environments. Cloud computing environments, which make use of virtualization technologies, such as virtual networking and virtual machine architectures, provide enhanced flexibility in the deployment of services and hardware infrastructures, by allowing for the abstraction of physical resources into logical representations. However, some of these attractive aspects of cloud computing environments can pose management challenges, for example, in the areas of provisioning, monitoring, and deploying such resources, because the very abstractions that provide flexibility can impede manageability.

With the arrival of cloud computing, network performance has become more dependent on efficient network management. Network management often determines the success or failure of a cloud offering.

Network management in a cloud environment can present additional challenges as compared to those in traditional IT management area. Facing dozens of or even hundreds of new customers on-boarding in a short time period and thousands of customers totally for overall management in the cloud, delivery of efficient and qualified network resource management in a way to provide rapid response, precise configuration and flexible control, based on various customer requirements and topology scenarios can be difficult to achieve.

Network administrators have been observed to perform manual-based network management for addressing customer network connection requests.

For the manual-based network approach, generally different network resource entities are configured by different internal network IT sub-teams a cloud service provider. This way is significantly time-consuming and usually error-prone, because there will be many communication efforts taken in the various inter-communication processes and precision will be potentially lost due to misunderstanding and a gap of communication in that process. Most important, it cannot adapt to the feature of the rapid provisioning of the cloud, especially under the scenario of several new customers requesting to be on-boarded in a short time.

SUMMARY

The shortcomings of the prior art are overcome, and additional advantages are provided, through the provision, in one aspect, of a method. The method can include, for example: obtaining, by one or more processor, user defined connectivity pattern information; and establishing, by the one or more processor, commands for provisioning one or more network device for implementation of a network connection based on the user defined connectivity pattern information. Accordingly, a network connection can be implemented in a simple and straightforward manner.

In one embodiment, the user defined connectivity pattern information can be absent a reference to a physical network device. Accordingly, where user defined connectivity pattern information is absent a reference to the physical network device, a user can define connectivity pattern information without performing research to ascertain and input a reference to the physical network device.

In one embodiment, the establishing can include using the user defined connectivity pattern information to key a device inventory database, the device inventory database including references to physical network devices.

In one embodiment, the establishing can include establishing commands for provisioning one or more network device for implementation of a network connection that includes an edge network device and a core network device. Where there is implemented a network connection that includes an edge network device and a core network device, there can be rapidly provided a network connection over a substantial portion of infrastructure of a data center according to common design.

In one embodiment, the establishing can include establishing commands for provisioning one or more network device for implementation of a network connection that includes two or more of an edge network device, a core network device, an access network device and a transit network device.

In one embodiment, the commands for provisioning can include commands for provisioning the one or more network device to perform OSI Layer 2 and OSI Layer 3 network communication protocols. Where commands for provisioning include commands for provisioning at multiple different layers of the OSI model, commands for provisioning can assure that there is appropriate coordination between network devices.

In one embodiment, the commands for provisioning can include commands for provisioning each of first and second network devices to perform OSI Layer 2 and OSI Layer 3 network communication protocols, wherein the first and second network devices have different roles, and wherein a role of each of the first and second network device is selected from the group consisting of edge, core, access, and transit, and wherein the user defined connectivity pattern information is absent of a reference to a physical network device.

In one embodiment, the commands for provisioning can include commands for provisioning each of first and second network devices to perform OSI Layer 2 and OSI Layer 3 network communication protocols, wherein the first and second network devices have different roles, and wherein a role of each of the first and second network device is selected from the group consisting of edge, core, access, and transit, and wherein the one or more processor employs program logic so that the one or more processor identifies entries for the first and second network devices within a device inventory database based on the user defined connectivity pattern information.

In one embodiment, the establishing can include (a) determining a dataset based on the user defined connectivity pattern information, the dataset defining a physical network device agnostic specification for a network connection configuration, and (b) using the dataset to key a device inventory database wherein the device inventory database includes references to physical network devices.

In one embodiment, a dataset defining a specification for a network connection configuration can specify a connection between an edge network device resource and a core network device resource.

In one embodiment, a dataset defining a specification for a network connection configuration can specify a connection between two or more of the following, selected from the group consisting of: an edge network device resource, a core network device resource, an access network device resource, and a transit network device resource.

In one embodiment, a dataset defining a specification for a network connection specifies one or more service for one or more network device resource, the one or more service selected from the group consisting of: routing service, load balancing service, VPN service, and firewall service.

In one embodiment, the establishing can include deriving a list of network devices and interfaces to configure based on the user defined connectivity pattern information, and composing a list of configuration command sets for network devices of the list of network devices.

In another aspect, a computer program product can be provided. The computer program product includes a computer readable storage medium readable by one or more processor and storing instructions for execution by the one or more processor for performing a method. The method can include, for example: obtaining user defined connectivity pattern information; and establishing commands for provisioning one or more network device for implementation of a network connection based on the user defined connectivity pattern information.

In a further aspect, a system can be provided. The system includes, for instance, a memory. In addition, the system includes one or more processor in communication with the memory. Further, the system includes program instructions executable by the one or more processor via the memory to perform a method. The method can include, for example: obtaining user defined connectivity pattern information; and establishing commands for provisioning one or more network device for implementation of a network connection based on the user defined connectivity pattern information.

Additional features and advantages are realized through the techniques set forth herein. Other embodiments and aspects are described in detail herein and are considered a part of the claimed invention.

BRIEF DESCRIPTION OF THE DRAWINGS

One or more aspects of the present invention are particularly pointed out and distinctly claimed as examples in the claims at the conclusion of the specification. The foregoing and other objects, features, and advantages of the invention are apparent from the following detailed description taken in conjunction with the accompanying drawings in which:

FIGS. 9A-9B represent data entries for network devices of a device inventory database; and FIG. 10 is a spreadsheet that represents user defined connectivity pattern information in one example, and which also represents a presented user interface in one embodiment.

DETAILED DESCRIPTION

Figure 1:
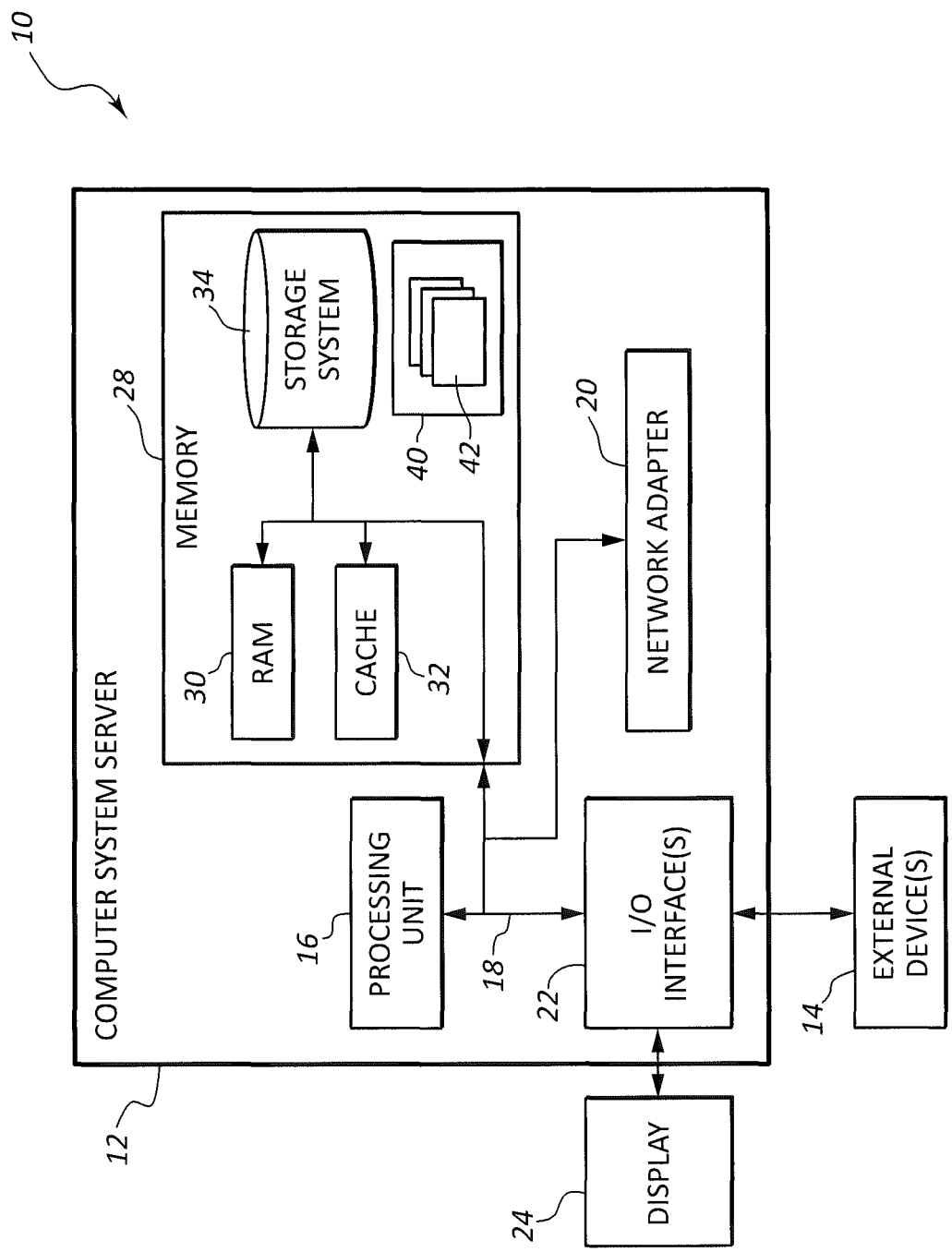
FIG. 1 depicts a cloud computing node according to an embodiment of the present invention.

Aspects of the present disclosure and certain features, advantages, and details thereof, are explained more fully below with reference to the non-limiting examples illustrated in the accompanying drawings. Descriptions of well-known materials, fabrication tools, processing techniques, etc., are omitted so as not to unnecessarily obscure the disclosure in detail. It should be understood, however, that the detailed description and the specific examples, while indicating aspects of the invention, are given by way of illustration only, and not by way of limitation. Various substitutions, modifications, additions, and/or arrangements, within the spirit and/or scope of the underlying inventive concepts will be apparent to those skilled in the art from this disclosure.

According to a common approach for addressing customer network connection requests, generally different network resource entities are configured by different internal network IT sub-teams of a cloud service provider. This way is significantly time-consuming and usually error-prone, because there will be many communication efforts taken in the various inter-communication processes and precision will be potentially lost due to misunderstanding and a gap of communication in that process. Most important, it cannot adapt to the feature of rapid provisioning of cloud especially under the scenario of several new customers requesting to be on-boarded in a short time.

The present disclosure provides, in part, methods, computer program products, systems, for provisioning network devices in a cloud computing environment.

FIGS. 1-4 depict various aspects of computing, including cloud computing, in accordance with one or more aspects set forth herein.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources, (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms, (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction, (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service, (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser, (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components, (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns, (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability, (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media, including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk, (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set, (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network, (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 2:
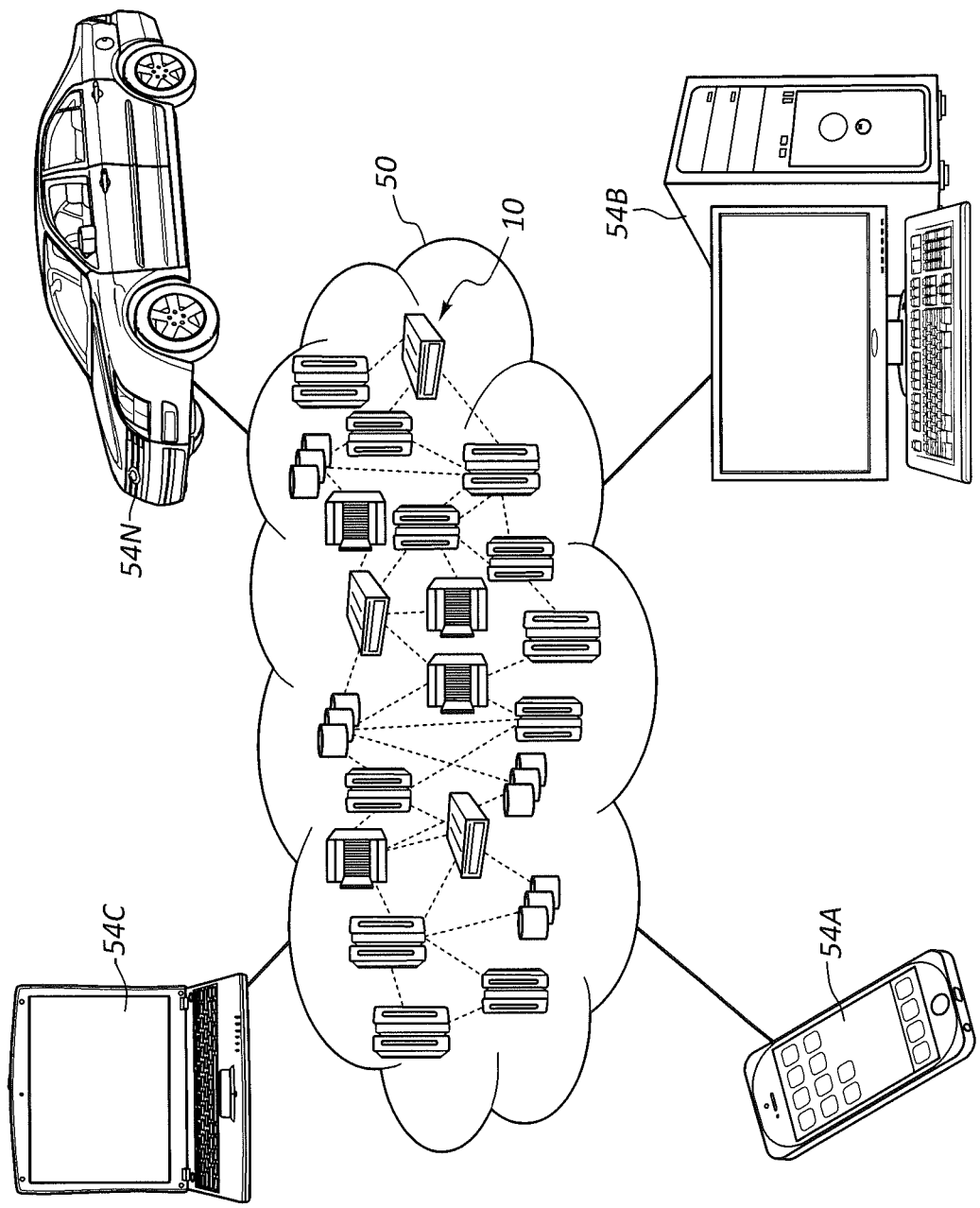
FIG. 2 depicts a cloud computing environment according to an embodiment of the present invention.

Referring now to FIG. 2, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection, (e.g., using a web browser).

Figure 3:
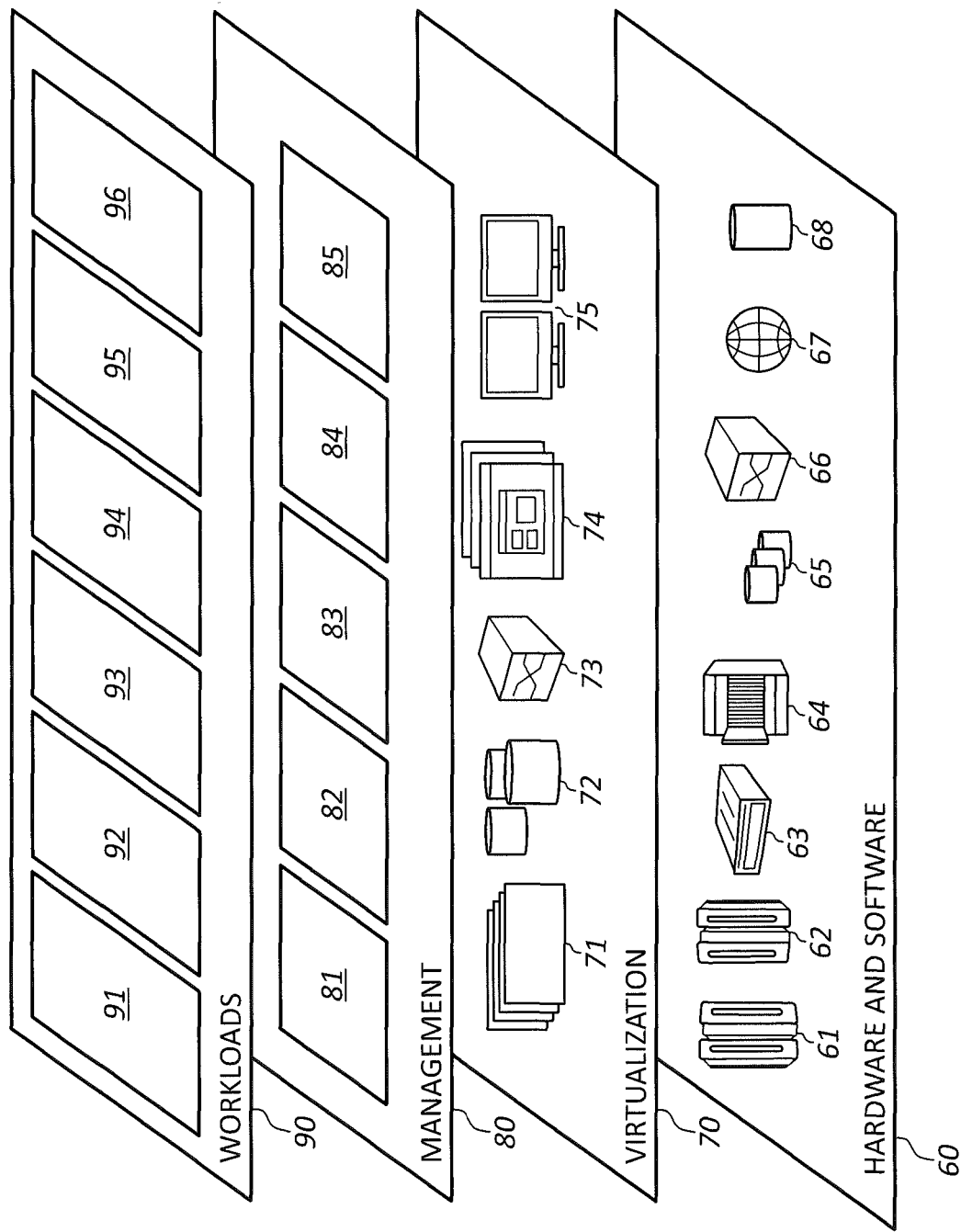
FIG. 3 depicts abstraction model layers according to an embodiment of the present invention.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and network device provisioning 96 as described herein.

Figure 4:
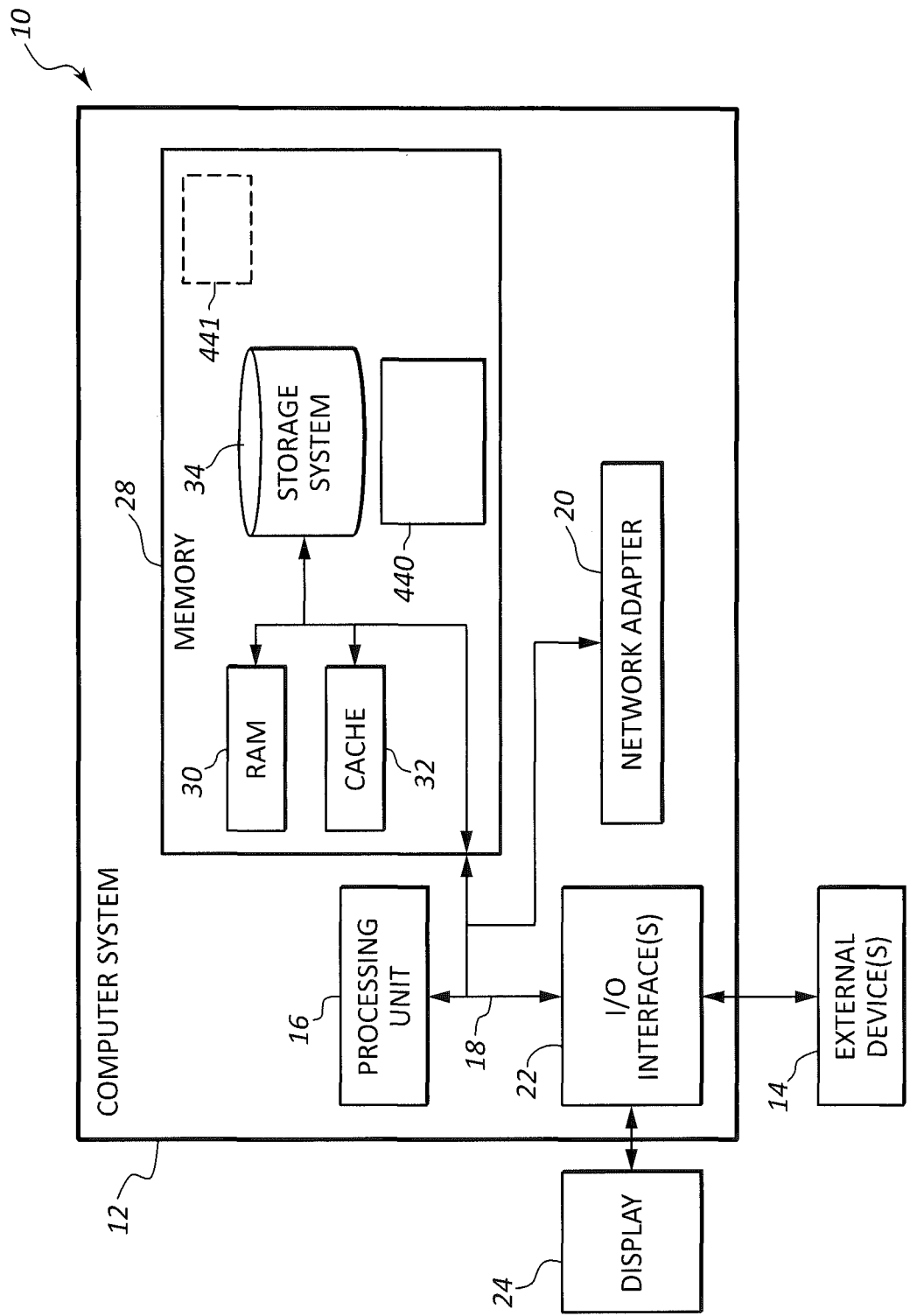
FIG. 4 depicts a hardware overview of a computing node, in accordance with one or more aspects set forth herein.

FIG. 4 depicts a hardware overview of a computing node 10, which may be a cloud computing node, in accordance with one or more aspects set forth herein. By way of example, computing node 10 may generally be any of the computing devices described herein, such as network devices, client computers, server computers, etc.

Program/Utility 40 as set forth in FIG. 1 can provide the functionality of network device provisioning 96 set forth in FIG. 3.

Program/utility 40 as set forth in FIG. 1 can include one or more program 440 as set forth in FIG. 4, and program/utility 40 as set forth in FIG. 1 can optionally include some or all of one or more program 441.

One or more program 440 can have a set (at least one) of program modules, and may be stored in memory 28 by way of example, and not limitation, as well as an operating system, one or more application programs, other program modules, and program data. Each of the operating system, one or more application programs, other program modules, program data, and one or more program, or some combination thereof, may include an implementation of a networking environment. One or more program 440 (and optionally one or more program 441) can generally carry out the functions and/or methodologies of embodiments of the invention as described herein, such as establishing commands for provisioning one or more network device for implementation of a connectivity pattern.

Referring again to FIG. 4, the present invention may be a system, a method, and/or a computer program product. The computer program product may include a computer readable storage medium (or media) having computer readable program instructions thereon for causing a processor to carry out aspects of the present invention, e.g. functions of one or more of programs 440, 441.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media, (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 5:
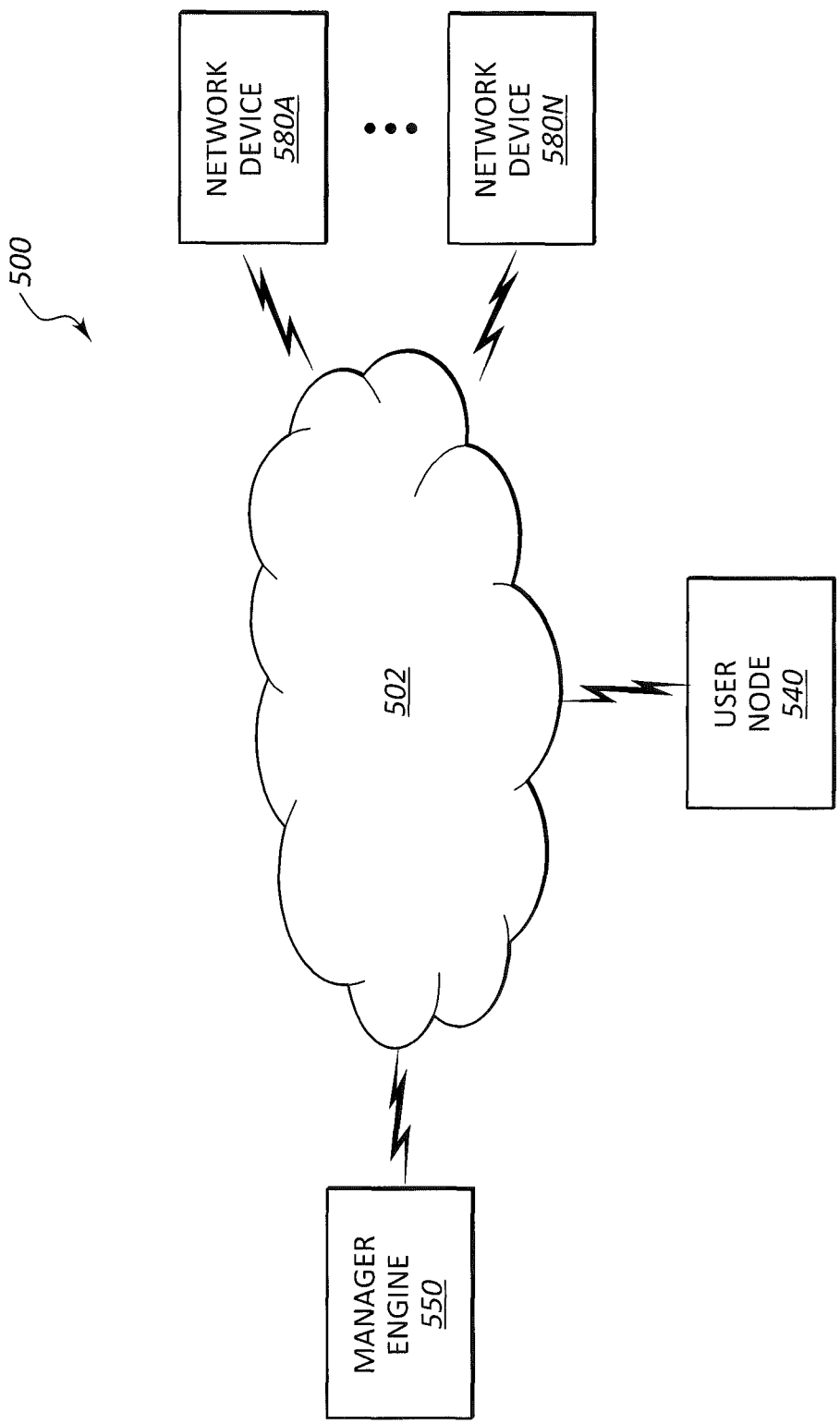
FIG. 5 is an exemplary block diagram of a system, in accordance with one or more aspects set forth herein.

FIG. 5 is an exemplary block diagram of a system 500, in accordance with one or more aspects set forth herein. In the embodiment of FIG. 5, system 500 includes numerous devices, which may be or include computing nodes 10 as previously described, connected by a network 502. For example, network 502 may be a physical network or a virtual network. A physical network can be, for example, a physical telecommunications network connecting numerous computer nodes or systems, such as computer servers and computer clients. By contrast a virtual network can, for example, combine numerous physical networks or parts thereof into a logical virtual network. In another example, numerous virtual networks can be defined over a single physical network.

By way of explanation, FIG. 5 depicts an example environment in which a user node 540 can input connectivity pattern information into manager engine 550, for example, so that a network connection configuration can be determined. In one example, a manager engine 550 can establish commands for provisioning network devices 580A-580N. Each of user node 540 and manager engine 550 and network devices 580A-580N can be configured according to computing nodes 10 as set forth in FIG. 4 in one example.

Figure 6:
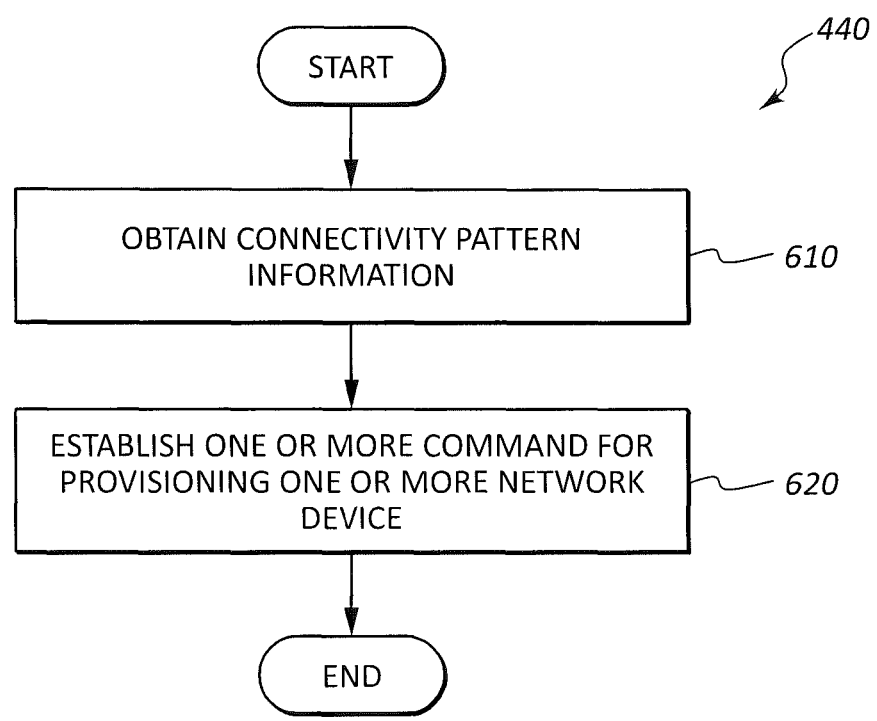
FIG. 6 depicts one or more embodiments of a process for establishing commands to provision one or more network device, in accordance with one or more aspects set forth herein.

FIG. 6 depicts embodiments of a process for use in provisioning one or more network device, in accordance with one or more aspects set forth herein. By way of example, the processes described with respect to FIG. 6 can be performed using one or more program 440 running on one or more device 550 (FIG. 5), as detailed with respect to FIG. 4.

In the embodiment of FIG. 6, one or more program 440 at block 610 can obtain user defined connectivity pattern information; and at block 620 can establish commands for provisioning one or more network device 580A-580N for implementation of a network connection based on the user defined connectivity pattern information.

In one embodiment, the user defined connectivity pattern information obtained at block 610 can be absent a reference to a physical network device.

In one embodiment, the establishing by one or more program 440 at block 620 can include using the user defined connectivity pattern information to key a device inventory database, the device inventory database including references to physical network devices.

In one embodiment, the establishing by one or more program 440 at block 620 can include establishing commands for provisioning one or more network device for implementation of a network connection that includes an edge network device and a core network device.

In one embodiment, the establishing of commands for provisioning by one or more program 440 at block 620 can include establishing commands for provisioning one or more network device for implementation of a network connection that includes two or more of an edge network device, a core network device, an access network device and a transit network device.

In one embodiment, the commands for provisioning that can be established at block 620 can include commands for provisioning the one or more network device to perform OSI Layer 2 and OSI Layer 3 network communication protocols.

In one embodiment, the commands for provisioning that can be established at block 620 can include commands for provisioning each of first and second network devices to perform OSI Layer 2 and OSI Layer 3 network communication protocols, wherein the first and second network devices have different roles, and wherein a role of each of the first and second network device is selected from the group consisting of edge, core, access, and transit, and wherein the user defined connectivity pattern information is absent of a reference to a physical network device.

In one embodiment, the commands for provisioning that can be established at block 620 can include commands for provisioning each of first and second network devices to perform OSI Layer 2 and OSI Layer 3 network communication protocols, wherein the first and second network devices have different roles, and wherein a role of each of the first and second network device is selected from the group consisting of edge, core, access, and transit, and wherein the one or more processor employs program logic so that the one or more processor identifies entries for the first and second network devices within a device inventory database based on the user defined connectivity pattern information.

In one embodiment, the establishing of commands for provisioning by one or more program 440 at block 620 can include (a) determining a dataset based on the user defined connectivity pattern information, the dataset defining a physical network device agnostic specification for a network connection configuration, and (b) using the dataset to key a device inventory database wherein the device inventory database includes references to physical network devices.

In one embodiment, a dataset used by one or more program 440 at block 620 can define a specification for a network connection configuration that can specify a connection between an edge network device resource and a core network device resource. In one embodiment, a dataset used by one or more program 440 at block 620 defining a specification for a network connection configuration can specify a connection between two or more of the following selected from the group consisting of: an edge network device resource, a core network device resource, an access network device resource, and a transit network device resource.

In one embodiment, a dataset used by one or more program 440 at block 620 defining a specification for a network connection specifies one or more service for one or more network device resource, the one or more service selected from the group consisting of: routing service, load balancing service, VPN service, and firewall service.

In one embodiment, the establishing by one or more program 440 at block 620 can include deriving a list of network devices and interfaces to configure based on the user defined connectivity pattern information, and composing a list of configuration command sets for network devices of the list of network devices.

Figure 7A:
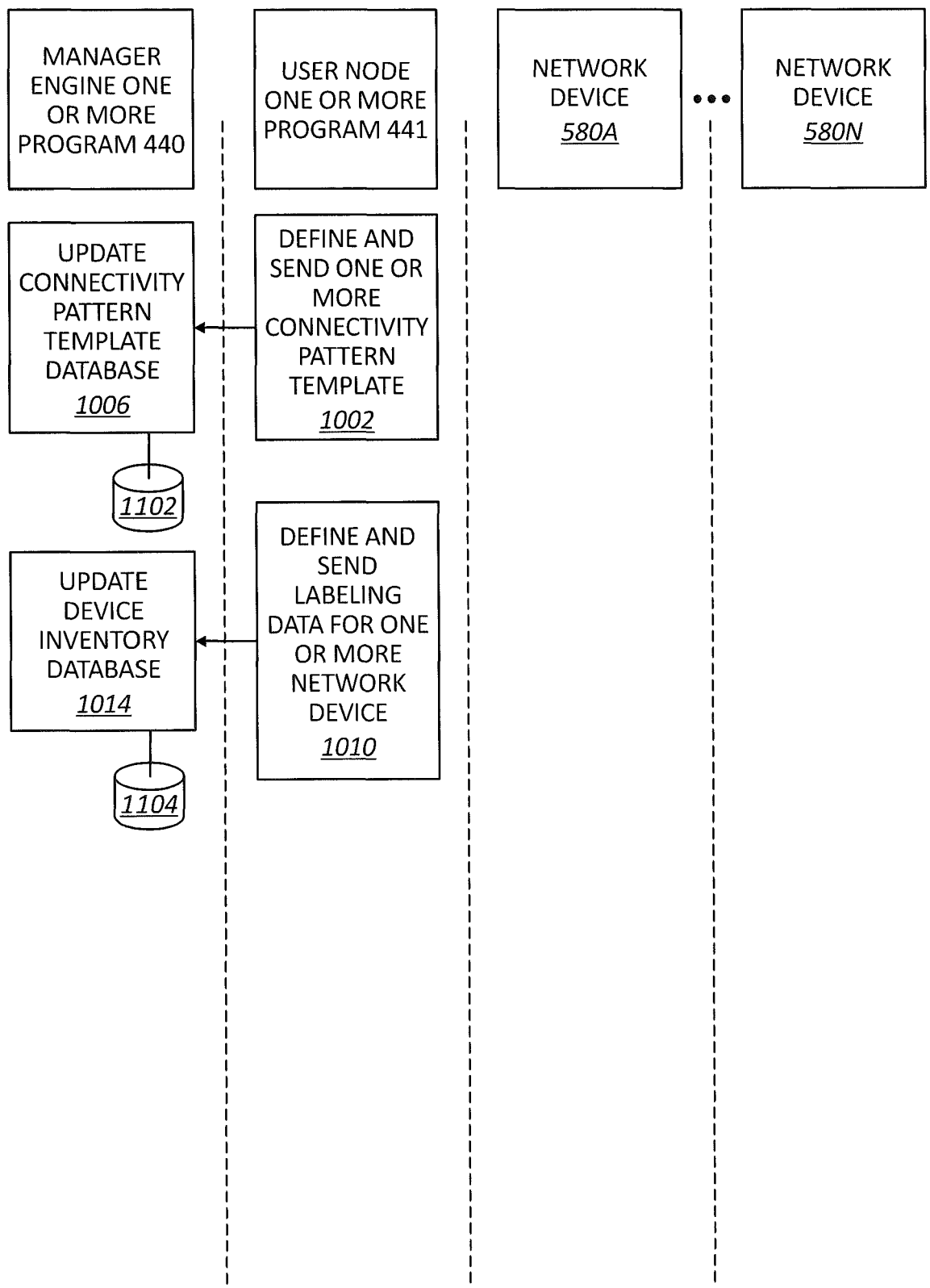
FIGS. 7A-7B are diagrams illustrating further aspects of a method for provisioning one or more network device, in accordance with one or more aspects set forth herein.
Figure 7B:
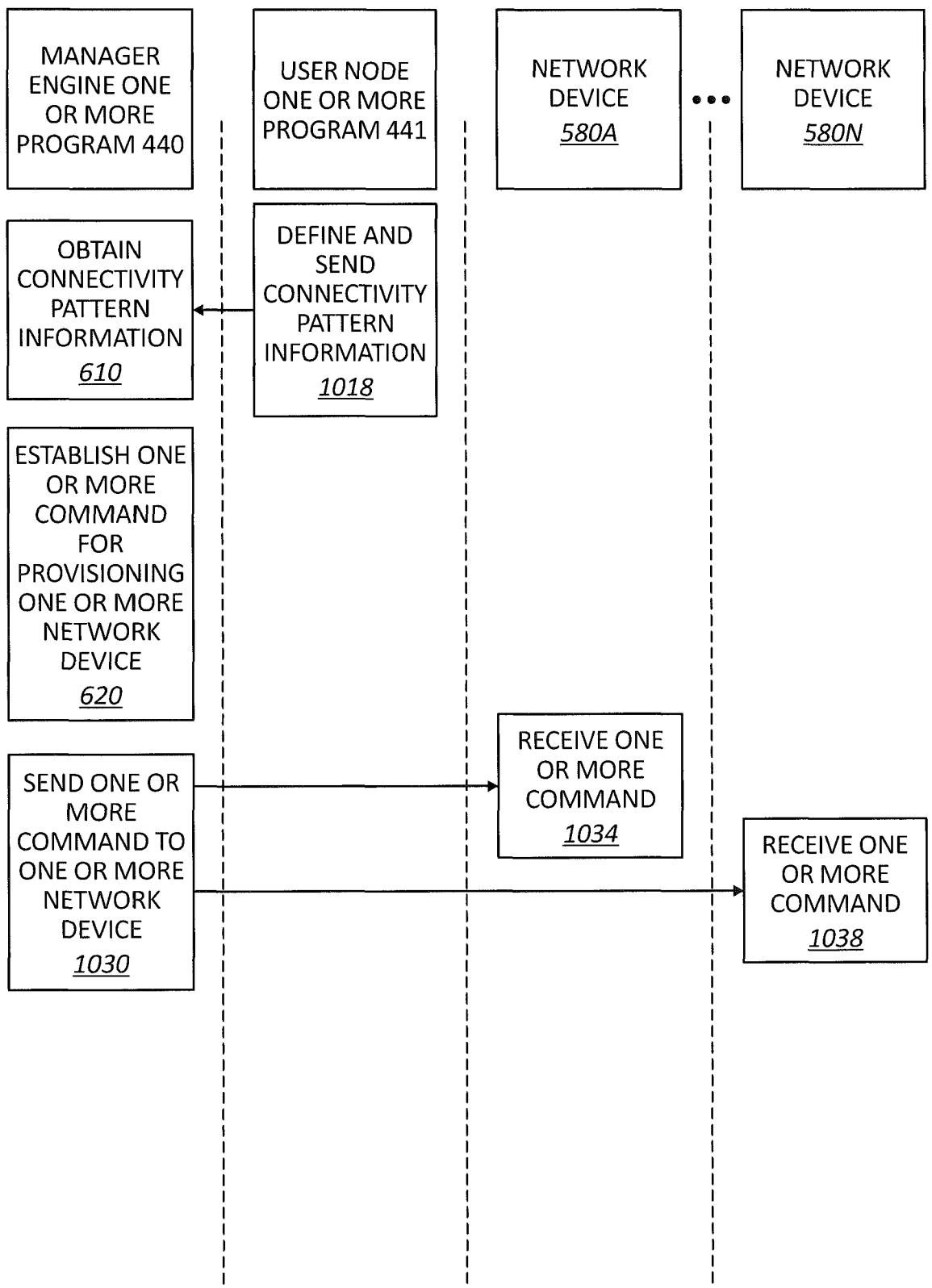

FIGS. 7A-7B are diagrams illustrating further aspects of a process for provisioning network devices 580A-580N based on user defined connectivity pattern information, in one embodiment in accordance with one or more aspects set forth herein. By way of explanation, in FIGS. 7A-7B, processes are illustrated from the point of view of a manager engine one or more program 440, (running e.g. on manager engine 550 of FIG. 5), and a user node one or more program 441, (e.g., running on user node 540 of FIG. 5).

In one or more embodiment, some or all of the programs 440-441 may run on a different collection of physical or virtual machines or processors, depending on the need for scalability of the system. In one specific example, all of the programs 440-441 could run on a single multi-processor computer system, (e.g., a server system). In another specific example, various portions of manager engine one or more program 440 may run on different processors running on different computing nodes.

By way of overview, FIGS. 7A-7B illustrate, at least in part, one or more embodiments in which a one or more processor can establish commands for implementation of a network connection.

With reference to FIG. 7A, one or more program 441 at block 1002 can define a dataset in the form of a connectivity pattern template based on or more user input. The dataset can define a specification for network connection configuration. Also at block 1002 one or more program, 441 can send a defined connectivity pattern template to manager engine one or more program 440, e.g., responsively to one or more user input. One or more program 440 at block 1006 can obtain the connectivity pattern template and can update a connectivity pattern template database 1102. Features of connectivity pattern templates in one embodiment are described in greater detail herein in reference to FIGS. 8A-8D. One or more program 440 at block 1002 can present visualization aids, e.g., graphics along with various other user interface enhancements, e.g., drop down menus, drag and drop functionality assist a user in designing a connectivity pattern template. Connectivity pattern database 1102 can be co-located with manager engine 550 or can be located external to manager engine 550.

One or more program 441 at block 1010 can define based on one or more user input device inventory labeling data for a network device, e.g., a switch. Also at block 1010 one or more program 441 can send user defined device labeling data to one or more program 440. One or more program 440 can then update a device inventory database 1104 at block 1014. Features of device inventory database 1104 and entries therein are described in greater detail herein. Device inventory database 1104 can be co-located with manager engine 550 or can be located external to manager engine 550.

At block 1018 one or more program 440 based on one or more user input can define connectivity pattern information. Also at block 1018 one or more program 441 can send connectivity pattern information to one or more program 440. One or more program 440 at block 610 can obtain the connectivity pattern information. The connectivity pattern information can be user defined connectivity pattern information.

At block 620 one or more program 440 can establish one or more command for provisioning one or more network device 580A-580N for implementation of network connection based on the user defined connectivity pattern information. At block 1030 one or more program 440 can send the one or more command to one or more network devices 580A-580N for implementation of a network connection, which network connection can In one embodiment, one or more program 440 can use device inventory database 1104 for establishing one or more command for provisioning one or more network device 580A-580N for implementation of network connection based on the user defined connectivity pattern information. Device inventory database 1104 can be configured to provide logical separation between physical network devices and user defined connectivity pattern information that defines a design for a network connection configuration. As such, a network architect can focus efforts designing functional aspects of a network connection configuration without regard to physical network devices that will be used to implement the network connection configuration.

In one embodiment, the establishing by one or more program 440 at block 620 can include using the user defined connectivity pattern information obtained at block 610 to key device inventory database 1104, the device inventory database 1104 including references to physical network devices.

In one embodiment, the establishing by one or more program 440 at block 620 using user defined connectivity pattern information to key device inventory database 1104 can include (a) determining a dataset based on the user defined connectivity pattern information, the dataset defining a physical network device agnostic specification for a network connection configuration, and (b) using the dataset to key a device inventory database 1104 wherein the device inventory database 1104 includes references to physical network devices.

In one embodiment, one or more program 440 at block 620 can use obtained user defined connectivity information obtained at block 620 to determine a dataset defining a physical network device agnostic specification for a network connection configuration by looking up a dataset based on obtained user defined connectivity pattern information. By defining a physical network device agnostic specification for a network connection configuration, a dataset herein can provide logical separation between a design of a network connection configuration and particulars of a physical infrastructure of a set of network devices.

In one example, a dataset herein can be provided by connectivity pattern template as referenced previously in connection with block 1002 and 1006. Representative examples of connectivity pattern templates are set forth in reference to FIGS. 8A-8D.

Figure 8A:
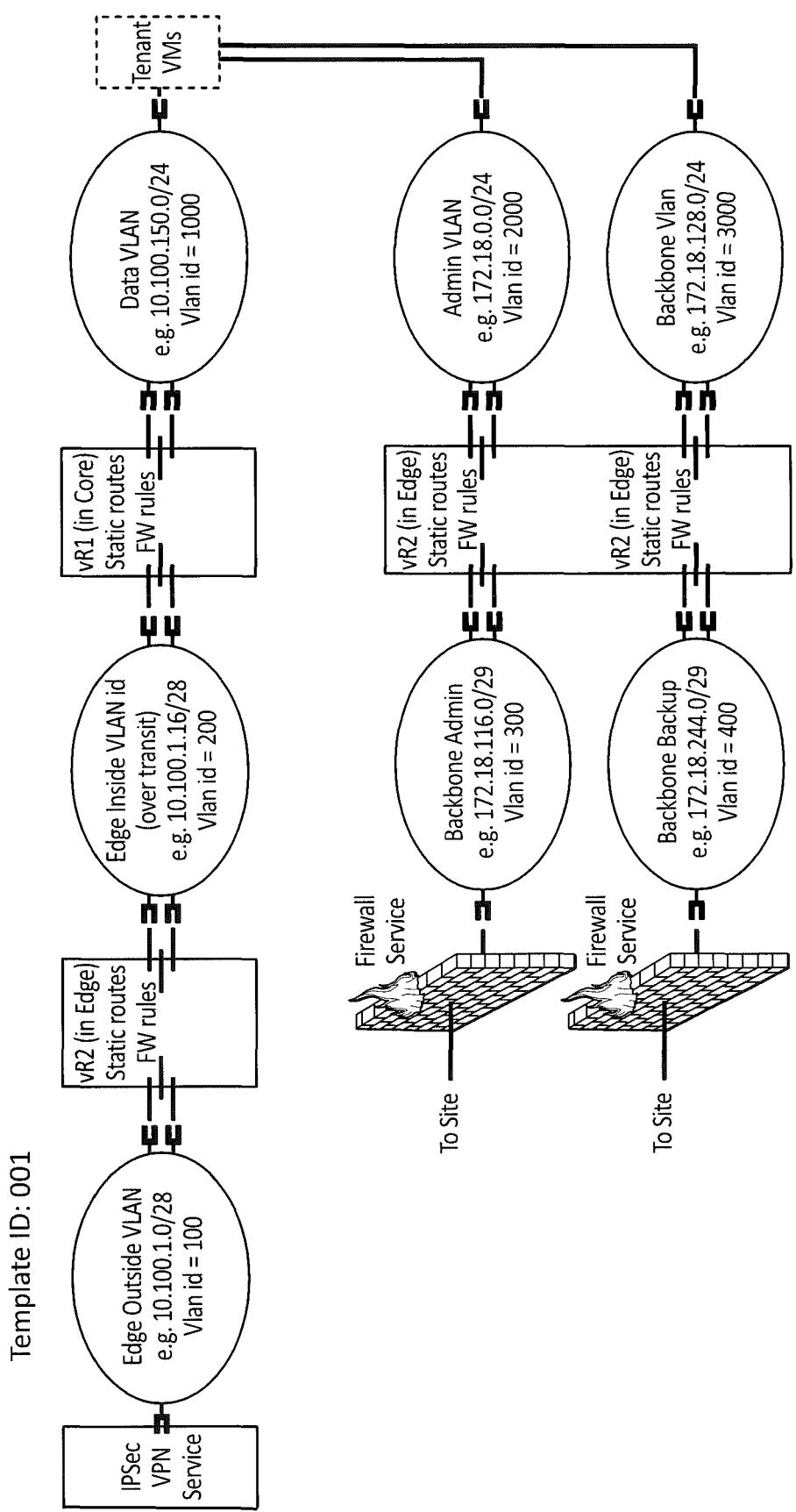
FIGS. 8A-8D are examples of connectivity pattern templates.

Representative exemplary connectivity pattern templates are shown in FIGS. 8A-8D. Connectivity pattern template 001 illustrated in FIG. 8A is a dataset in the form of a connectivity pattern template that specifies a network connection configuration that connects cloud tenant applications that run on the tenant virtual machines with the application users via a pair of VPN devices, which establishes a secured tunnel back between the cloud data center network to the cloud tenant's home enterprise network through the data VLAN. This network connection configuration also connects the tenant virtual machines to admin VLAN and backup VLAN for the purpose of system administration and backup.

Figure 8B:
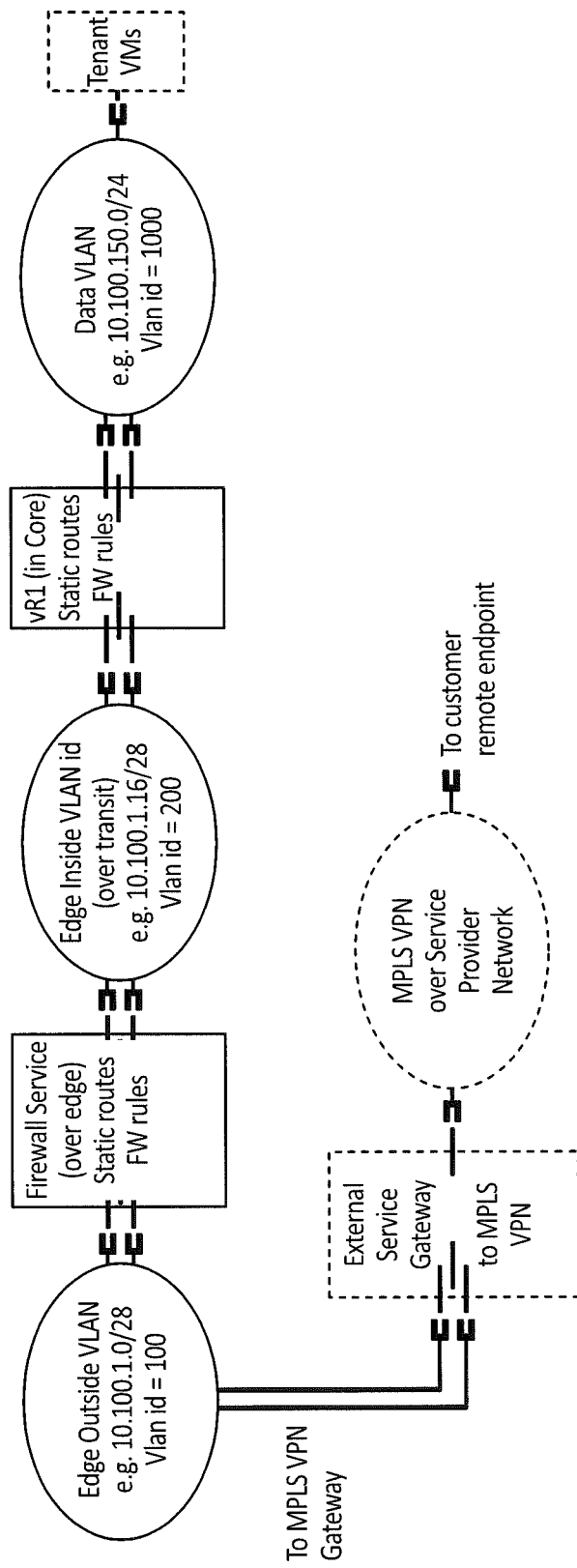

Connectivity pattern template 002 illustrated in FIG. 8B is a dataset on the form of a connectivity pattern template that specified a network connection configuration that connects cloud tenant applications with the application users via MPLS VPN service provided by a $3^{rd}$ party network service provider. This network connection configuration also includes firewall service enabled at the edge device.

Figure 8C:
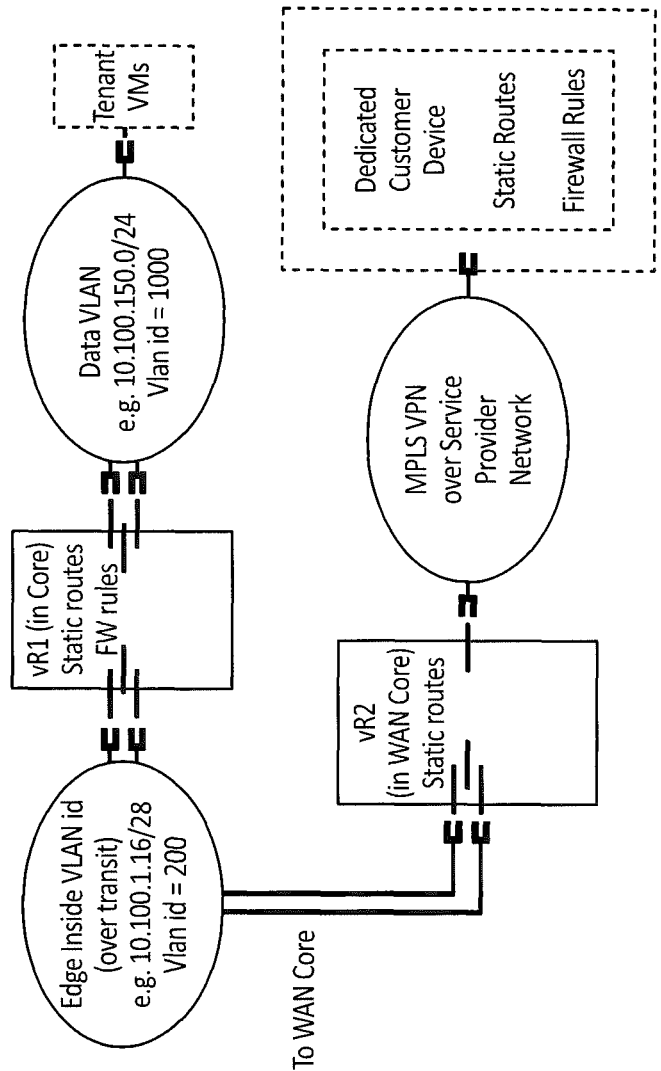

Connectivity pattern template 003 shown in FIG. 8C is a dataset in the form of a connectivity pattern template that specifies a network connection configuration where cloud tenant applications are connected to the application users via a pair of dedicated customer devices and dedicated telecommunications links, (e.g., T1/E1 leased lines). FIGS. 8A, 8B, 8C illustrate datasets that define specifications for different network connection configurations that facilitate a cloud tenant to reach into cloud data center network.

Figure 8D:
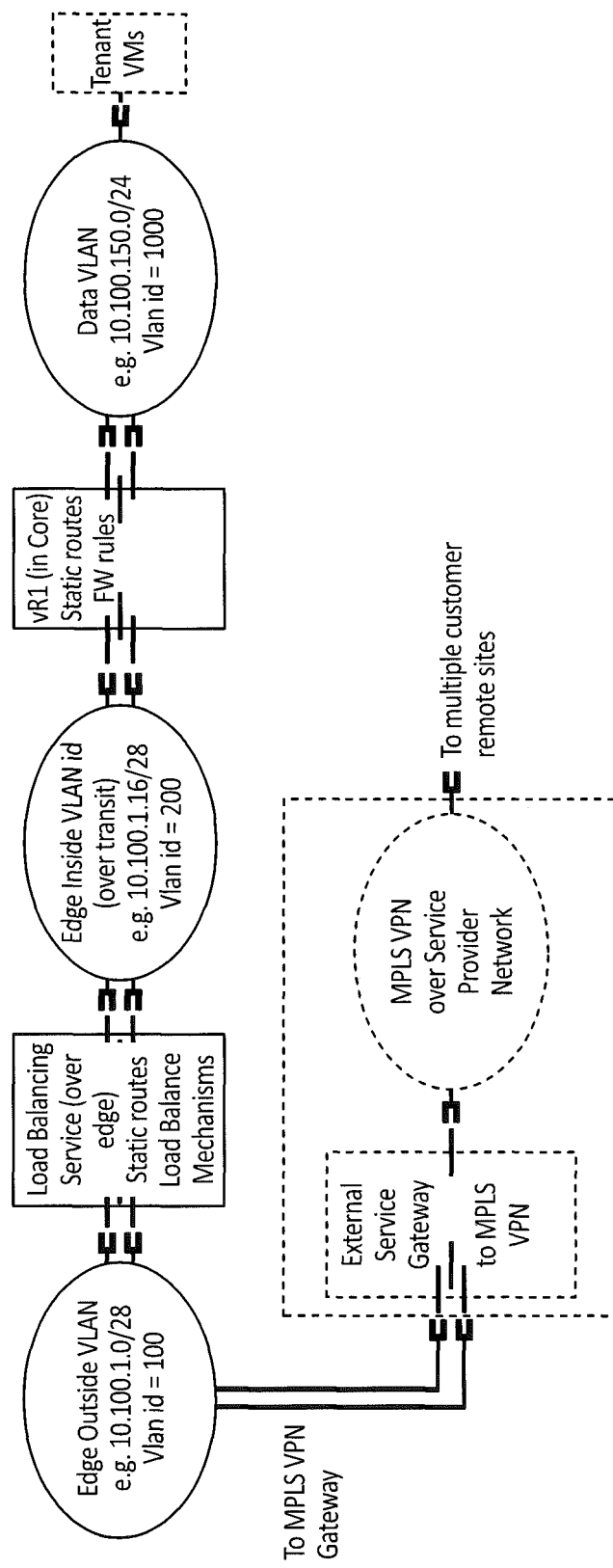

Connectivity pattern template 004 illustrated in FIG. 8D is a dataset in the form of a connectivity pattern template that specifies a network connection configuration that connects cloud tenant applications with the application users via MPLS VPN service provided by a 3$^{rd}$ party network service provider with load balancing service enabled.

A dataset can define a network topology. A dataset such as a connectivity pattern template can define a network in terms of, e.g., (a) network device resources, (b) connections between the network device resources, and (c) services and parameters including (i) "roles" for network device resources, and (ii) "scope" for network device resources. Referring to the connectivity pattern template 001 of FIG. 8A, the connectivity pattern template 001 can include network device resources, e.g., VR1, VR2, connections between network resources (designated in the circles of FIG. 8A) and service, (e.g., virtual routing service of VR1, firewall services). Referring to the connectivity pattern template 001 of FIG. 8A, the connectivity pattern template 001 can include parameters, one example could include the IP Subnet Addresses of the connections between the network devices of different "roles". Another example could be the VLAN numbers of the connections where the transport layer technology employed is 802.1q VLAN. Another example could include load balancing mechanisms (round-robin, least connection, etc.) to be employed on a network device with a role to provide load balancing service of FIG. 8D.

In one embodiment, a dataset such as a connectivity pattern template defining a specification for a network connection configuration can specify a connection between an edge network device resource and a core network device resource. In one embodiment, a dataset such as a connectivity pattern template defining a specification for a network connection configuration can specify a connection between two or more of the following selected from the group consisting of: an edge network device resource, a core network device resource, an access network device resource, and a transit network device resource. A dataset as set forth herein that defines a network connection configuration can define an "end to end" connection of a tenant application in a (cloud) data center. A dataset as set forth can enable the end-to-end full automation of the provisioning of such an "end to end" connection so as to quickly support a new tenant application.

In one embodiment, a dataset such as a connectivity pattern template defining a specification for a network connection configuration can be a physical network device agnostic specification for a network connection configuration. While a dataset defining a specification for a network connection configuration can set forth characteristics of a network connection configuration, such as "role" and "scope" as set forth herein the dataset can be absent a reference to a particular physical network device. Accordingly, a network architect can design a network connection configuration without regard to details of a physical network device.

In one embodiment, a dataset defining a specification for a network connection configuration can be absent a reference to a particular physical network device but can include logic that facilitates keying into the device inventory database 1104. Accordingly, in one embodiment, one or program 440 at block 620 can use a determined dataset and device inventory database 1104 to identify physical network devices that can be provisioned for implementation of a network connection.

In one embodiment, a dataset defining a specification for a network connection configuration and device inventory database 1104 can include one or more linking parameter so that one or more program 440 on the determination of a dataset can key device inventory database 1104 using the one or more linking parameter.

As has been described herein a dataset defining a specification for a network connection configuration can specify for a network device resource a "role" and "scope". In one embodiment, network device entries of device inventory database 1104 can likewise include "role" and "scope" labels, and, for establishing commands for provisioning one or more network device at block 620 one or more program 440 can identify physical network devices for provisioning be searching for physical network devices of network inventory database 1104 having "role" and "scope" values satisfying the specified "roles" and "scope" values of the dataset defining a specification for a network connection configuration.

Examples of "roles" that can be included in a dataset such as a connectivity pattern template defining a network connection configuration include "core", "access", "edge", "transit", "firewall appliance", "load balancer appliance", and "vpn appliance".

Examples of "scope" labels that can be included in a dataset such as a connectivity pattern template defining a network connection configuration include "data", "admin", "backup", "edge-inside", "edge-outside", "firewall-inside", "firewall-outside", "dmz", "dedicated-private", "LB-inside", "LB-outside". In one embodiment, "role" labels for a network device can be assigned on a per network device resource basis, and "scope" labels can be assigned on a per network device resource port basis. Scopes can have associated permitted and not permitted statuses. For example the scope "EI" may be assigned where a port can have an "edge-inside" scope, and a scope "-EI" where a port of a network device is not permitted to operate as an edge inside port.

As set forth in connection with the examples of connectivity pattern templates 001, 002, 003, 004 of FIGS. 8A-8D a dataset such as a connectivity pattern template herein can specify services associated to network device resources in addition to "roles" and "scopes". Examples of services that can be associated to a network device resource can include, for example, routing services, load balancing services, VPN services, and firewall services.

Further regarding device inventory database 1104, device inventory database 1104 can have entries for one or more network device, e.g., a switch. A network device can be a physical network device having first second and up to Nth ports. Network device parameters of a network device represented in database 1104 as has been previously noted can include "role" parameters and "scope" parameters which can serve as linking parameters with "role" and "scope" parameters of a dataset defining network connection configuration. FIGS. 9A and 9B illustrate parameters that can be included in a device inventory database for a network device, e.g., network device 123 and network device 456 as illustrated in FIGS. 9A and 9B respectively.

Examples of "roles" that can be included in a network device entry of device inventory database include "core", "access", "edge", "transit", "firewall appliance", "load balancer appliance", and "vpn appliance"

Examples of "scope" parameters that can be included in a network device entry of device inventory database 1104 include "data", "admin", "backup", "edge-inside", "edge-outside", "firewall-inside", "firewall-outside", "dmz", "dedicated-private", "LB-inside", "LB-outside". In one embodiment, "role" labels for a network device can be assigned on a per network device basis, and "scope" labels can be assigned on a per network device port basis. Scopes can have associated permitted and not permitted statuses. For example, the scope "EI" may be assigned where a port can have an "edge-inside" scope, and a scope "EI" where a port of a network device is not permitted to operate as an edge inside port.

In one example, connectivity pattern information obtained at block 610 can include information as is represented in the spreadsheet of FIG. 10. FIG. 10 represents an example of user defined connectivity pattern information that can be obtained at block 610 and also represents in one embodiment a user interface that can be presented by one or more program 441 at block 1002, (e.g., one or program 441 can present for display on a display associated with user node 540 as shown in FIG. 5 a spreadsheet for completion by a user).

Obtained user defined connectivity information can specify one or more aspect of a network connection configuration. In one embodiment, one or more program 440 can be configured so that one or more program 440 can determine a dataset by looking up in connectivity pattern template database 1102 a connectivity pattern template based on user defined connectivity pattern information. Configured as described a designer may be enabled to design a network connection configuration with an input of simplified user friendly information as connectivity pattern information. In one example dataset "roles" and "scopes" may be associated to a connectivity pattern template that is determined using obtained user defined connectivity pattern information and need not be specified by a user at block 1018.

In one embodiment, rather than obtaining simplified "user friendly" user defined connectivity pattern information at block 610 one or more program 440 at block 610 can obtain more comprehensive connectivity pattern information. In one example user connectivity pattern information can include a designed connectivity pattern template such as template 001, 002, 003 and 004 which may be designed by a user with use of visualization aids and other user interface enhancements as set forth herein in reference to block 1002. Where connectivity pattern information is provided by a connectivity pattern template such as template 001, 002, 003, 004 determining of a dataset by one or more program 440 based on the connectivity pattern information can include examination of user defined input information that specifies the use of the connectivity pattern template as a dataset.

In one embodiment, at block 1002 rather than presenting a user interface for entry of information as depicted in FIG. 1, one or more program 441 can present a menu of candidate connectivity pattern templates that have been stored in connectivity pattern template database 1102. In such an embodiment, the obtaining of connectivity pattern information at block 1006 can be regarded to be the selection information of the user and the determining of a dataset based on the user defined connectivity pattern information can be provided by the identifying of the selected template based on the selection information.

In the case one or more program 440 determines at block 620 a dataset defining a network connection configuration, one or more program 440 at block 620 can employ a variety of applied logic functions for determining a dataset defining a specification for a network connection configuration based on obtained user defined connectivity pattern information. In addition to or alternatively to employing lookups and/or menu selection features as set forth hereinabove, one or more program 440 for determination of a dataset that is logically separated from device inventory database 1104 and which can be used to key device inventory database 1104 can employ algorithms, including algorithms that employ artificial intelligence and algorithms that process dynamically varying, e.g., sensed inputs.

With a dataset defining a specification for a network connection configuration determined, one or more program 440 at block 1030 can provision one or more network device 580A-580N. At block 620 one or more program 440 can derive the list of network devices and list of interfaces to configure using the keying functionality set forth herein to key and access network device information from device inventory database 1104. One or more program 440 further at block 620 can compose a list of configuration command sets by accessing commands from a device command set database that can be keyed based on specified services of a dataset as set forth herein, e.g., routing services, load balancing services, VPN services, and firewall services which can be associated to a network device resource. One or more program 440 can send resulting configuration commands to the identified network devices at block 1030.

In one aspect, connectivity pattern information obtained at block 610 can be user defined connectivity pattern information that is absent of any information of any physical network device. As set forth herein a dataset can define a specification for a network connection configuration in terms of physical device agnostic network device resources, roles for network device resources, scope, and services. The designer of a connectivity pattern is freed of responsibility to consider physical network device infrastructure.

With a dataset specifying a network connection configuration determined, it has been noted that one or more program 440 at block 620 in one embodiment can identify a set of network devices 580A-580N to provision for implementation of the network connection configuration. Importantly, less than all available devices, (e.g., of a data center) can be identified for provisioning. Network devices identified for provisioning can include network devices 580A-580N whereas an entire inventory of available network devices can include network devices 580A-580Z. Accordingly, methods as set forth herein economize utilization of network resources.

As set forth herein according to one embodiment, for identifying network devices for provisioning, one or more program 440 at block 620 can search for matches between specification items of a dataset defining a specification for a network connection configuration and network device entries of device inventory database 1104. In one example, matches can occur when there is a same value for a common linking parameter between a dataset and an entry of device inventory database 1104. For example, one or more program 440 in the case of a network connection configuration defined by a template specifying a network device resource having a "core" role specified and an connection having a "edge inside" scope, can search database 1104 for a network device entry labeled with a "core" role and an "edge inside" port.

In establishing provisioning commands for provisioning network devices 580A-580N, commands for provisioning can include commands so that the operation of the network device is in accordance with the required role and scope (for one or more port) of the network device. As set forth herein provisioning commands for provisioning one or more network device can also include commands so that services requires of connectivity pattern templates defining a connectivity pattern are satisfied.

In one aspect one or more program 440, when there is a sending of connectivity pattern information by one or more program 441 at block 1002, can perform blocks 610, 620 and 1030 automatically so that responsively to the sending of provisioning commands at block 1002 by one or more program 441 network devices 580A-580Z are provisioned to perform according to a determined network connection configuration without any manual setup of any physical network device. A set of one or more network device can be provisioned to operate in accordance with a designed network connection configuration in short time without substantial setup delay.

According to one advantage, different network connection configurations defined by datasets herein can be rapidly defined and implemented without delay over a complex physical network device infrastructure. This means, e.g., that a data center can rapidly service the requirements of different customers. It also means that the single customer can quickly change a current network connection configuration, (e.g., to add a firewall, an external connection, a dedicated port, etc.) without expectancy of down time in its provided services.

According to another advantage, a designed and defined network connection configuration as defined by a dataset defining a network connection configuration can be provided in reusable form and can easily be transported between different environments having different, even significantly different physical network device infrastructures. This means that a customer's requirements can be easily serviced by different computing environments, e.g., data centers. It also means that a business entity maintaining many computing environments can focus efforts on designing connectivity patterns which, may be used across different physical infrastructures without concern of particular characteristics of physical network devices of the different infrastructures. It also means that a business entity could quickly migrate/move/recover its applications/workloads from one physical infrastructure to another different physical infrastructure while maintaining the same logical network connection configuration at times such as when there is a disaster recovery requirement.

There is set forth herein a method including determining, by one or more processor, a dataset based on user defined connectivity pattern information, the dataset defining a physical network device agnostic specification for a network connection configuration; establishing, by the one or more processor, commands for provisioning one or more network device for implementation of a first network connection according to the network connection configuration over a first physical network device infrastructure at a first data center; establishing, by the one or more processor, commands for provisioning one or more network device for implementation of a second network connection according to the network connection configuration over a second physical network device infrastructure at a second data center.

The terminology used herein is for the purpose of describing particular embodiments only and is not intended to be limiting. As used herein, the singular forms "a," "an," and "the" are intended to include the plural forms as well, unless the context clearly indicates otherwise. It will be further understood that the terms "comprise" (and any form of comprise, such as "comprises" and "comprising"), "have" (and any form of have, such as "has" and "having"), "include" (and any form of include, such as "includes" and "including"), and "contain" (and any form of contain, such as "contains" and "containing") are open-ended linking verbs. As a result, a method or device that "comprises," "has," "includes," or "contains" one or more steps or elements possesses those one or more steps or elements, but is not limited to possessing only those one or more steps or elements. Likewise, a step of a method or an element of a device that "comprises," "has," "includes," or "contains" one or more features possesses those one or more features, but is not limited to possessing only those one or more features. Forms of the term "based on" encompass relationships where an element is entirely based as well as relationships where an elements is partially based on. Forms of the term "defined" encompass relationships where an element is entirely defined as well as relationships where an element is partially defined. Methods, system and apparatus set forth as having a certain number of elements can be practiced with less than or greater than the certain number of elements. Furthermore, a device or structure that is configured in a certain way is configured in at least that way, but may also be configured in ways that are not listed.

The corresponding structures, materials, acts, and equivalents of all means or step plus function elements in the claims below, if any, are intended to include any structure, material, or act for performing the function in combination with other claimed elements as specifically claimed. The description set forth herein has been presented for purposes of illustration and description, but is not intended to be exhaustive or limited to the form disclosed. Many modifications and variations will be apparent to those of ordinary skill in the art without departing from the scope and spirit of the disclosure. The embodiment was chosen and described in order to best explain the principles of one or more aspects set forth herein and the practical application, and to enable others of ordinary skill in the art to understand one or more aspects as described herein for various embodiments with various modifications as are suited to the particular use contemplated.

What is claimed is:

1. A method comprising:
   obtaining, by one or more processor, connectivity pattern information; and
   establishing, by the one or more processor, commands for provisioning one or more network device for implementation of a network connection based on the connectivity pattern information.

2. The method of claim 1, wherein the establishing includes using the connectivity pattern information to key a device inventory database, the device inventory database including references to physical network devices.

3. The method of claim 1, wherein the establishing includes establishing commands for provisioning one or more network device for implementation of a network connection that includes two or more of an edge network device, a core network device, an access network device and a transit network device.

4. The method of claim 1, wherein the establishing includes determining a dataset based on the connectivity pattern information, the dataset defining a physical network device agnostic specification for a network connection configuration, and wherein the establishing includes establishing the commands for provisioning the one or more network device for implementation of the network connection according to the network connection configuration.

5. The method of claim 1, wherein the establishing includes determining a dataset defining a network connection configuration specification for a network connection configuration, wherein the specification for a network connection configuration specifies one or more service for one or more network device resource, the one or more service selected from the group consisting of: routing service, load balancing service, VPN service, and firewall service.

6. The method of claim 1, wherein the establishing includes determining a dataset based on the connectivity pattern information, the dataset defining a physical network device agnostic specification for a network connection configuration, and wherein the establishing includes establishing the commands for provisioning the one or more network device for implementation of the network connection according to the network connection configuration, wherein the establishing includes deriving a list of network devices and interfaces to configure based on the connectivity pattern information, and composing a list of configuration command sets for network devices of the list of network devices.

7. The method of claim 1, wherein the establishing includes deriving a list of network devices and interfaces to configure based on the connectivity pattern information, and composing a list of configuration command sets for network devices of the list of network devices.

8. The method of claim 1, wherein the connectivity pattern information is absent a reference to a physical network device.

9. The method of claim 1, wherein the establishing includes determining a dataset based on the connectivity pattern information, the dataset defining a physical network device agnostic specification for a network connection configuration, and wherein the establishing includes establishing the commands for provisioning the one or more network device for implementation of the network connection over a first physical network device infrastructure according to the network connection configuration, and establishing commands for provisioning at least one network device for implementation of a second network connection according to the network connection configuration over a second physical network device infrastructure.

10. The method of claim 1, wherein the commands for provisioning include commands for provisioning each of first and second network devices to perform OSI Layer 2 and OSI Layer 3 network communication protocols, wherein the first and second network devices have different roles, and wherein a role of each of the first and second network device is selected from the group consisting of edge, core, access, and transit, and wherein the connectivity pattern information is absent of a reference to a physical network device.

11. The method of claim 1, wherein the establishing includes determining a dataset based on the connectivity pattern information, the dataset defining a physical network device agnostic specification for a network connection configuration, and wherein the establishing includes establishing the commands for provisioning the one or more network device for implementation of the network connection according to the network connection configuration, wherein the establishing includes using the connectivity pattern information to key a device inventory database, the device inventory database including references to physical network devices.

12. The method of claim 1, wherein the establishing includes determining a dataset based on the connectivity pattern information, the dataset defining a physical network device agnostic specification for a network connection configuration, and wherein the establishing includes establishing the commands for provisioning the one or more network device for implementation of the network connection according to the network connection configuration, wherein the establishing includes establishing commands for provisioning one or more network device for implementation of a network connection that includes two or more of an edge network device, a core network device, an access network device and a transit network device.

13. The method of claim 1, wherein the establishing includes (a) determining a dataset based on the connectivity pattern information, the dataset defining a physical network device agnostic specification for a network connection configuration, and (b) using the dataset to key a device inventory database that includes references to physical network devices.

14. The method of claim 1, wherein the establishing includes determining a dataset defining a network connection configuration specification for a network connection configuration, wherein the specification for a network connection configuration specifies a connection between an edge network device resource and a core network device resource.

15. The method of claim 1, wherein the establishing includes determining a dataset based on the connectivity pattern information, the dataset defining a physical network device agnostic specification for a network connection configuration, and wherein the establishing includes establishing the commands for provisioning the one or more network device for implementation of the network connection according to the network connection configuration, wherein the establishing includes determining a dataset defining a network connection configuration specification for a network connection configuration, wherein the specification for a network connection configuration specifies a connection between an edge network device resource and a core network device resource.

16. The method of claim 1, wherein the establishing includes determining a dataset based on the connectivity pattern information, the dataset defining a physical network device agnostic specification for a network connection configuration, and wherein the establishing includes establishing the commands for provisioning the one or more network device for implementation of the network connection according to the network connection configuration, wherein the establishing includes determining a dataset defining a network connection configuration specification for a network connection configuration, wherein the specification for a network connection configuration specifies one or more service for one or more network device resource, the one or more service selected from the group consisting of: routing service, load balancing service, VPN service, and firewall service.

17. The method of claim 1, wherein the establishing includes determining a dataset based on the connectivity pattern information, the dataset defining a physical network device agnostic specification for a network connection configuration, and wherein the establishing includes establishing the commands for provisioning the one or more network device for implementation of the network connection according to the network connection configuration, wherein the commands for provisioning include commands for provisioning each of first and second network devices to perform OSI Layer 2 and OSI Layer 3 network communication protocols, wherein the first and second network devices have different roles, and wherein a role of each of the first and second network device is selected from the group consisting of edge, core, access, and transit, and wherein the connectivity pattern information is absent of a reference to a physical network device.

18. A computer program product comprising:
   a computer readable storage medium readable by one or more processing circuit and storing instructions for execution by a one or more processor for performing a method comprising:
      obtaining connectivity pattern information; and
      establishing commands for provisioning one or more network device for implementation of a network connection based on the connectivity pattern information.

19. The computer program product of claim 18, wherein the connectivity pattern information is absent a reference to a physical network device.

20. The computer program product of claim 18, wherein the establishing includes using the connectivity pattern information to key a device inventory database, the device inventory database including references to physical network devices.

21. The computer program product of claim 18, wherein the establishing includes establishing commands for provisioning one or more network device for implementation of a network connection that includes an edge network device and a core network device.

22. The computer program product of claim 18, wherein the establishing includes establishing commands for provisioning one or more network device for implementation of a network connection that includes two or more of an edge network device, a core network device, an access network device and a transit network device.

23. The computer program product of claim 18, wherein the establishing includes (a) determining a dataset based on the connectivity pattern information, the dataset defining a physical network device agnostic specification for a network connection configuration, and (b) using the dataset to key a device inventory database that includes references to physical network devices.

24. The computer program product of claim 18, wherein the establishing includes determining a dataset defining a network connection configuration specification for a network connection configuration, wherein the specification for a network connection configuration specifies a connection between an edge network device resource and a core network device resource.

25. A system comprising:
   a memory;
   one or more processor in communication with the memory; and
   program instructions executable by the one or more processor via the memory to perform a method, the method comprising:
      obtaining connectivity pattern information; and
      establishing commands for provisioning one or more network device for implementation of a network connection based on the connectivity pattern information.

* * * * *